Sept. 20, 1932.  G. JAEGER  1,878,278
ROAD OR PAVEMENT MAKING APPARATUS
Filed Dec. 22, 1928
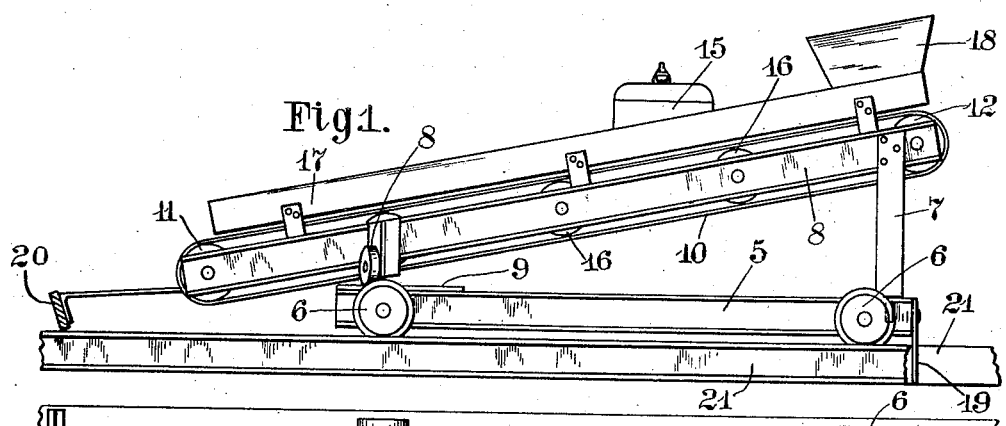
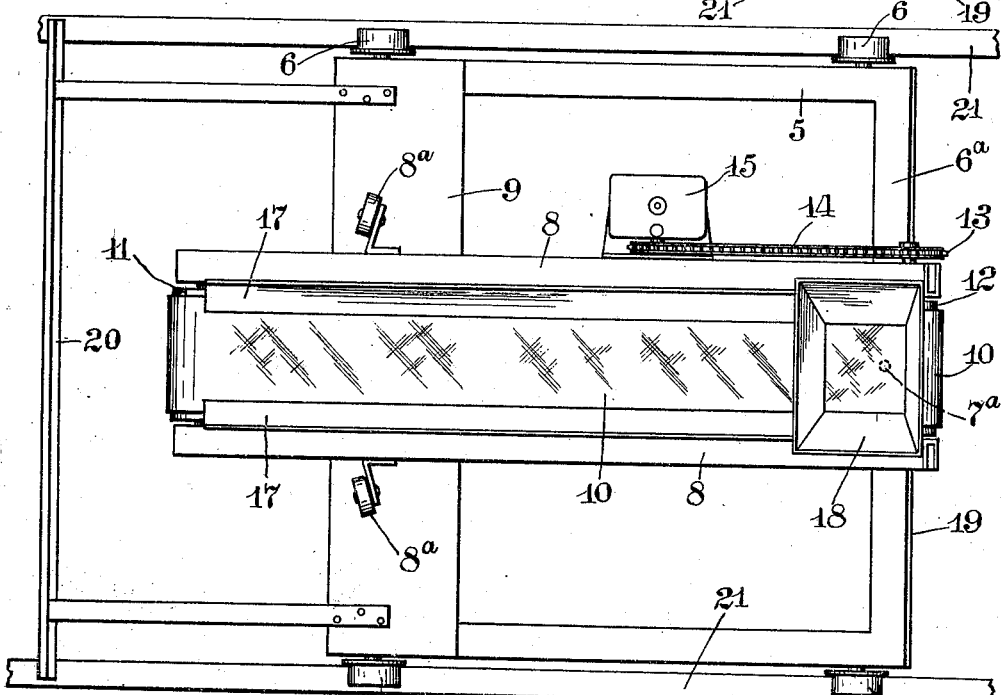
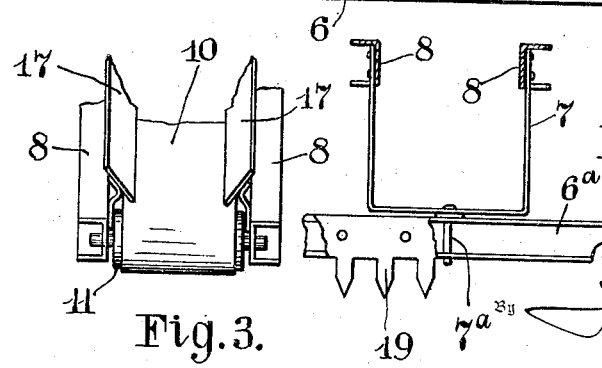
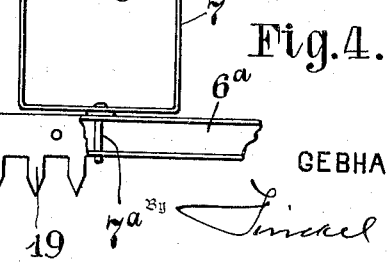
Inventor
GEBHARD JAEGER Patented Sept. 20, 1932

1,878,278

UNITED STATES PATENT OFFICE

GEBHARD JAEGER, OF COLUMBUS, OHIO, ASSIGNOR TO THE JAEGER MACHINE COMPANY, OF COLUMBUS, OHIO, A CORPORATION OF OHIO

ROAD OR PAVEMENT MAKING APPARATUS

Application filed December 22, 1928. Serial No. 327,813.

The object of this invention is to provide a simple and improved apparatus to take the place of the usual boom and bucket employed for spreading concrete, especially in the making of pavements and roads. Other objects will appear from the disclosure herein.

According to the invention there is provided a truck, a frame pivoted on said truck and carrying a conveyor belt, means for driving the belt, a hopper for receiving the concrete materials and discharging the same upon said belt for delivery to the ground, means for testing the sub-bed and means for leveling the top of the deposited concrete.

The invention is embodied in the example herein shown and described, the features of novelty being finally claimed.

In the accompanying drawing—

Figure 1 is a view in side elevation of the apparatus according to the invention.

Fig. 2 is a top plan view of the same.

Fig. 3 is a detail showing the construction at the lower end of the conveyor belt and its supporting means.

Fig. 4 is a rear view to illustrate some details.

In the views 5 designates the truck frame which is shown as having supporting wheels 6 preferably flanged like railway car wheels.

The frame for carrying the conveyor belt includes at its rear end a U-shaped standard 7 to which are secured parallel side sills 8, 8, that are inclined downward toward the front or discharge end. The U-shaped standard 7 is provided with a pivoting pin 7ª to enter a bearing in the cross member 6ª of the truck frame.

The forward ends of the sills are provided with plain rollers 8ª to support the sills and the conveyor belt carried thereby on a wide plate 9 on top of the forward end of the truck frame so that said conveyor belt and its carrying frame can be swung on the pivot pin from side to side.

10 designates the conveyor belt which extends around a roller 11 at the lower or forward end of its carrying frame and a roller 12 at the rear or upper end of said conveyor carrying frame.

One end of the shaft of the roller 12 has secured to it a sprocket wheel 13 by means of which it is driven by a sprocket chain 14 from a suitable motor 15. By making the belt of suitable inclination the engine can be omitted and gravity relied on to cause the travel of the belt.

The conveyor belt can have its upper flight supported by means of suitable idler rollers 16, 16, to prevent it from sagging.

Secured to the sills of the conveyor belt frame by suitable brackets are inclined side boards 17, 17, adapted to confine the concrete material to the conveyor belt as it is carried toward the discharge points by the conveyor belt.

Secured to said side boards at the rear end of the apparatus is a hopper 18, into which the concrete material is fed and from which it is discharged onto the conveyor belt.

At the rear of the truck there are provided a series of pointed projections 19, the points of which are in a line for the purpose of testing the trueness of the sub-bed, one or more of the pins scratching the soil as the apparatus advances and any bumps left thereon thus indicating where the sub-bed is to be rectified.

At the forward end of the truck frame secured by arms to the plate is a leveler or tool 20 adapted to spread out and level the top of the concrete as the apparatus is advanced.

It is designed that the pavement or road or portion thereof to be laid shall be defined by pre-laid tracks or road forms 21, upon which the flanged supporting wheels of the truck may travel and the apparatus guided as the work progresses.

In practice the conveyor belt is continuously moved so that its upper flight travels from under the hopper to the discharge or forward end of the apparatus, therefore when the concrete material is supplied to said upper flight it is carried to the discharge end, the discharge of the belt and its carrying frame being swung back and forth to deposit the concrete material in an arc across the entire width of the road. The apparatus can be moved by a truck, carrying means for supplying the hopper with the material.

As fast as one transverse arc of the road is supplied with the necessary quantity of the concrete material the truck is moved rearward to a new position to lay a new arc of material. As fast as laid by the apparatus the deposited concrete is spread and smoothed by the spreader 20.

The forms of the parts can be changed without departing from the gist of the invention as claimed.

What I claim is:

1. Apparatus for laying a concrete road or pavement on a sub-bed including a truck having a cross piece constituting a support, a frame pivoted at one end on the truck to swing transversely of the road or pavement to be laid, a concrete conveyor belt carried by said frame, said belt downwardly inclined from the pivot end of said frame, means for supporting the free end of said belt-conveying frame on said cross piece, a hopper for receiving the concrete materials and discharging the same onto the upper portion of said belt, and toothed means on the truck for testing and leveling the sub-bed in advance of depositing the concrete.

2. Apparatus for laying a concrete road or pavement on a sub-bed including a truck having a cross piece constituting a support, a frame pivoted at one end on the truck to swing transversely of the road or pavement to be laid, a concrete conveyor belt carried by said frame, means for driving the belt, means for supporting the free end of said belt conveying frame on said cross piece, a hopper for receiving the concrete materials and discharging the same onto the rear portion of said belt, and toothed means on the truck for testing and leveling the sub-bed in advance of depositing the concrete.

GEBHARD JAEGER.